United States Patent
Hof et al.

(10) Patent No.: US 9,446,439 B2
(45) Date of Patent: Sep. 20, 2016

(54) PROCESS FOR MANUFACTURING A WOUND HOSE, PARTICULARLY A SPIRAL WOUND METALLIC HOSE, AS WELL AS WOUND HOSE AND FLEXIBLE CONDUCTION ELEMENT WITH A WOUND HOSE

(75) Inventors: Henrik Hof, Weingarten (DE); Marc Pontzen, Speyer (DE); Jürgen Büchele, Ettlingen (DE)

(73) Assignee: BOA Balg-und Kompensatoren-Technologie GmbH, Stutensee (DE)

( * ) Notice: Subject to any disclaimer, the term of this patent is extended or adjusted under 35 U.S.C. 154(b) by 503 days.

(21) Appl. No.: 13/988,138

(22) PCT Filed: Aug. 2, 2012

(86) PCT No.: PCT/EP2012/003287
§ 371 (c)(1),
(2), (4) Date: May 17, 2013

(87) PCT Pub. No.: WO2013/023744
PCT Pub. Date: Feb. 21, 2013

(65) Prior Publication Data
US 2013/0233433 A1    Sep. 12, 2013

(30) Foreign Application Priority Data
Aug. 16, 2011    (DE) .......... 10 2011 110 219

(51) Int. Cl.
*F16L 11/16*    (2006.01)
*B21C 37/12*    (2006.01)
*F01N 13/18*    (2010.01)

(52) U.S. Cl.
CPC .......... *B21C 37/121* (2013.01); *B21C 37/123* (2013.01); *B21C 37/124* (2013.01); *F16L 11/16* (2013.01); *F01N 13/1816* (2013.01)

(58) Field of Classification Search
CPC .......... F16L 11/14; F16L 11/15; F16L 11/16; F16L 11/18; F16L 11/20
See application file for complete search history.

(56) References Cited

U.S. PATENT DOCUMENTS

| | | | |
|---|---|---|---|
| 840,536 A * | 1/1907 | Weir ................. | F16L 33/01 138/109 |
| 3,771,570 A * | 11/1973 | Coleman ............ | F16L 11/16 138/131 |
| 4,516,608 A * | 5/1985 | Titus ................. | F16L 9/14 138/120 |
| 4,862,924 A * | 9/1989 | Kanao ............... | F16L 11/16 138/122 |
| 5,143,123 A * | 9/1992 | Richards ........... | F16L 11/18 138/110 |
| 5,222,288 A * | 6/1993 | Thomas ............. | B21C 37/121 29/429 |

(Continued)

FOREIGN PATENT DOCUMENTS

| | | |
|---|---|---|
| DE | 10 2007 043 944 A1 | 3/2009 |
| DE | 10 2009 040072 A1 | 3/2011 |
| EP | 056 1211 A1 | 9/1993 |

*Primary Examiner* — Jacob Cigna
(74) *Attorney, Agent, or Firm* — McGlew and Tuttle, P.C.

(57) ABSTRACT

A heat-insulated wound hose is formed by a process, in which a metal wound hose is at first upset, such that turns, which are spaced apart by adjacent axial wall areas of individual turns, form at least one uninterrupted jacket wall surface. A ceramic-based coating is subsequently applied to the at least one uninterrupted jacket wall surface. The coating is then cured, and the wound hose thus formed is subsequently pulled apart, whereby adjacent axial wall areas of adjacent turns are detached from one another and thereby the coating is broken up at partitions.

15 Claims, 2 Drawing Sheets

(56) References Cited

U.S. PATENT DOCUMENTS

| | | | | |
|---|---|---|---|---|
| 5,601,893 A * | 2/1997 | Strassel | ................ | F16L 9/147 138/118 |
| 6,230,748 B1 * | 5/2001 | Krawietz | ............ | F01N 13/1816 138/114 |
| 7,533,906 B2 * | 5/2009 | Luettgen | ................ | H01R 35/00 285/146.1 |
| 2001/0015233 A1 * | 8/2001 | Herman | ................ | B21C 37/124 138/135 |
| 2004/0175540 A1 * | 9/2004 | Fukui | ..................... | F16L 11/02 428/122 |
| 2005/0011573 A1 * | 1/2005 | Chahine | ................. | F16L 11/16 138/148 |
| 2006/0278291 A1 * | 12/2006 | Baumhoff | ............... | F16L 11/16 138/135 |
| 2007/0132232 A1 * | 6/2007 | Baumhoff | ........... | F01N 13/1816 285/226 |
| 2012/0000564 A1 * | 1/2012 | Tsapatsaris | ............. | F16L 11/18 138/155 |

\* cited by examiner

PROCESS FOR MANUFACTURING A WOUND HOSE, PARTICULARLY A SPIRAL WOUND METALLIC HOSE, AS WELL AS WOUND HOSE AND FLEXIBLE CONDUCTION ELEMENT WITH A WOUND HOSE

CROSS REFERENCE TO RELATED APPLICATIONS

This application is a United States National Phase Application of International Application PCT/EP2012/003287 filed Aug. 2, 2012 and claims the benefit of priority under 35 U.S.C. §119 of German Patent Application DE 10 2011 110 219.5 filed Aug. 16, 2011, the entire contents of which are incorporated herein by reference.

FIELD OF THE INVENTION

The present invention pertains to a process for manufacturing a wound hose, and especially a spiral wound metallic hose, in which at first a metal wound hose is manufactured from at least one metal profile strip in a manner known per se, as well as to a wound hose with turns, extending axially on the inner and outer wall areas lying on different radii and enmeshed sections with a radial extension component and to a flexible conduction element with a wound hose as inliner.

BACKGROUND OF THE INVENTION

Wound hoses, especially in the form of spiral wound metallic hoses, are used for conducting fluids (exhaust gases) especially in motor vehicles. These hoses are not leakproof. In order to achieve full tightness, they are used as inliners in a bellows or a corrugated hose having uncoupling elements. It is desirable to minimize the temperature losses in the exhaust gas flowing through the wound hose and, on the one hand, to protect a surrounding bellows against the hot exhaust gases, which have a temperature of 400° C. to 550° C. there, and, on the other hand, to keep the exhaust gas temperature high in this case and also when using a wound hose as a single conduction element for the later aftertreatment for the purpose of reducing foreign substances, such as by means of catalysts, since such an aftertreatment is better or particularly effective at higher temperatures.

For creating a heat-insulated wound hose, a suggestion was already made to form such a hose from at least two separate profiled strip layers, which are wound together, whereby one layer consists of metal and the other consists of heat-insulating material; the latter was preferably inserted between two metal strip layers in a sandwich-like pattern. While a wound hose formed in this manner creates a good heat insulation, it is very costly to manufacture; also, wound hoses with the three said layers—metal on the outside in each—case are necessary in practical terms, since heat-insulating material with high coefficients of friction would otherwise cause friction on one another.

A major drawback of the prior-art process is, moreover, that in a profiled strip material consisting of multilayer flat strip material with at least one metal layer and one insulating layer, especially if this is ceramic, which is needed for manufacturing the wound hose, because of the profiling process and especially when folding the strip layer, the insulating layer may tear and peel off from the metal layer, such that waste forms and/or the insulating layer in the finished wound hose is interrupted.

SUMMARY OF THE INVENTION

Hence, a basic object of the present invention is to create a wound hose that can be manufactured in a simple and cost-effective manner in terms of production technology while avoiding the above-mentioned drawbacks.

According to the present invention, the object is accomplished with a process of the type mentioned in the introduction, which is characterized in
that the metal wound hose is upset, such that its turns spaced apart by adjacent wall areas of individual turns form at least one uninterrupted jacket wall surface;
that a ceramic-based coating is subsequently applied to the at least one uninterrupted jacket wall surface,
that the coating is cured, and
the wound hose thus formed is subsequently is pulled apart, whereby adjacent wall areas of adjacent turns are detached from one another and thereby the coating is broken up at partitions.

The wound hose has especially turns that have inner and outer wall areas extending axially lying on different radii and enmeshed sections with a radial extension component. It is achieved by means of the present invention that, on the one hand, the largest area of the axial wall of the wound hose is provided with a ceramic-based coating at least on one side, preferably on the inside of the wound hose, and, on the other hand, the mobility of the wound hose is not reduced, since this coating is not found in the area of the wound hose having sections in the direction of radial extension through the process according to the present invention, but rather these sections are, in addition, purely metallic and are not provided with the coating.

Liquid resin coatings, which form a three-dimensional ceramic matrix on the axial wall areas of the wound hose provided with the coating by means of curing, are especially possible as ceramic-based coating. The coating causes a reduction of the heat flow from the interior of the wound hose to its outside, especially due to a reflection of the heat radiation released by the exhaust gas and possibly also due to the selective heat conductivity of ceramic compared to the metal material of the wound hose.

In a preferred embodiment of the process, provisions are made for the wall areas to be coated to be cleaned, especially by means of glass bead blasting, before applying the coating.

Preferred variants of the process according to the present invention provide that the ceramic-based coating is cured at high temperatures, and preferably in the range of 250° C. to 270° C., over a time between 40 and 60 minutes and/or that the coating is carried out by means of a liquid resin, which forms a three-dimensional ceramic matrix during the curing.

In a preferred embodiment of the process, provisions may be made for both the inner and outer wall areas of the wound hose to be coated.

A wound hose according to the present invention is characterized in that only axial wall areas are provided with a ceramic-based coating on their side facing away from each of the other axial wall areas. It is especially manufactured according to the above-mentioned process.

In a preferred embodiment, provisions may be made for either only inner or only outer wall areas to be coated with a ceramic-based coating and/or for the surfaces both of the inner and outer radially directed wall areas, which are continuously directed away from each other, to be provided with a ceramic-based coating. A flexible conduction element according to the present invention has a bellows and a wound hose with a ceramic-based coating on axial wall areas, the latter is especially manufactured according to a process of the invention.

One essential advantage of the process according to the present invention and of the wound hose created according to the present invention is that the ceramic coating is first applied to the finished wound hose and only to axially extending wall areas of the wound hose, especially from the inside of the wound hose, such that especially at least wall areas of the starting metal wound hose that also have directions of radial extension remain uncoated and thus there is neither an increase in friction in the mobility of the wound hose, nor is there the risk of damage to the ceramic coating due to the deformation steps during the manufacture.

Further advantages and features of the present invention arise from the following description, in which an exemplary embodiment of the present invention is explained in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
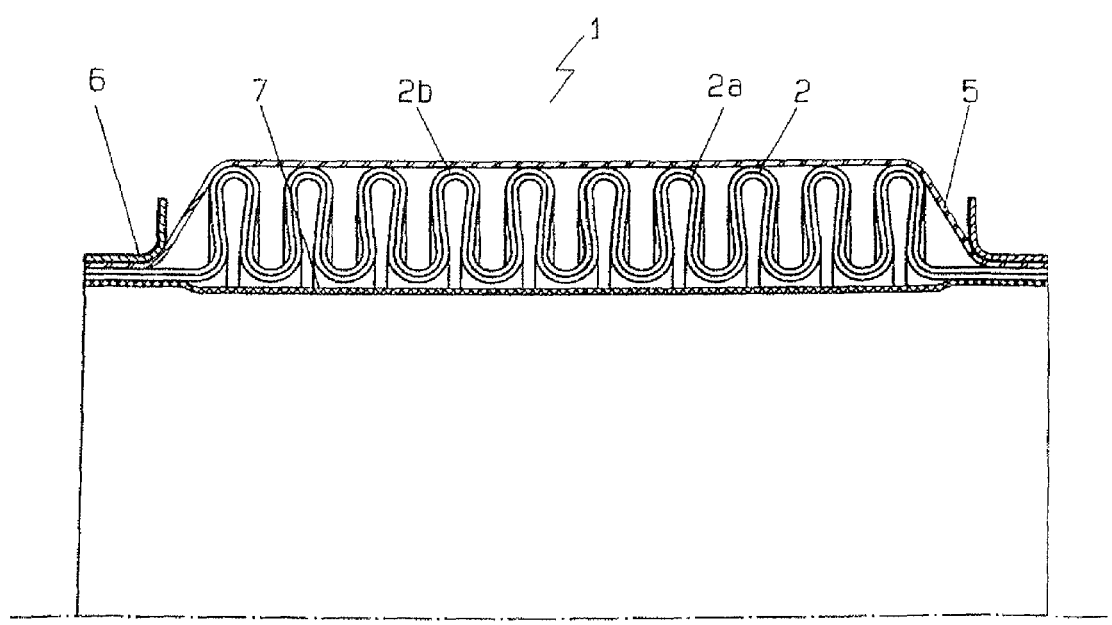
FIG. 1 is a partial sectional view of a flexible conduction element, especially for an exhaust system of a motor vehicle.

Referring to the drawings in particular, FIG. 1 shows a flexible conduction element 1 for the exhaust system of a motor vehicle, which is arranged between the engine and the exhaust system and is used for vibration isolation between the engine and the exhaust system. Such an element is also called an isolation element (EKE).

The flexible conduction element 1 has a corrugated hose or bellows 2, here with two layers 2a, 2b, as supportive part and thus main part. The thickness of the bellows layers 2a, 2b is usually between 0.2 mm and 0.4 mm. On the outside, the bellows 2 is provided with a metal wire hose 5 made of braiding or knitted fabric in order to protect it thus against external mechanical effects and foreign bodies. In the interior of the bellows 2 is provided a wound hose 7 in the form of a spiral wound metallic hose, which is used for routing gas and for protecting the bellows against the hot exhaust gases of the motor vehicle engine.

The said parts are provided at both ends of the bellows with outer angle rings 6 and are pressed as well as possibly welded against one another with these.

Figure 2A:
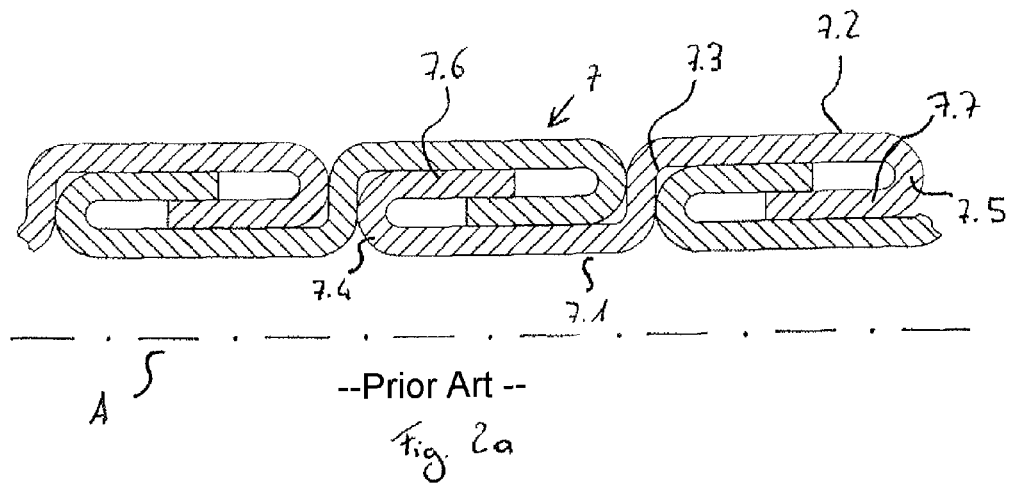
FIG. 2a is a sectional view showing a conventional metal wound hose (spiral wound metallic hose) in an upset configuration as an essential process step according to the present invention for manufacturing a wound hose according to the present invention, preferably for use in a flexible conduction element according to FIG. 1.

FIG. 2a shows a conventional metallic wound hose 7 in the form of a spiral wound metallic hose, where the dash-dotted line A indicates the central axis (of symmetry) of the wound hose. A wound hose 7 is as a rule formed by a screw-shaped, coiled profile strip.

In the coiled state, each turn of the metal strip has an inner and an outer wall area 7.1, 7.2, lying at a different radial height and extending parallel to the axis A each, which are connected in one piece by means of a connection section 7.3 to at least one radial extension component, here a radial extension direction. At their free ends, the wall areas 7.1, 7.2 have hook sections 7.4, 7.5 extending essentially parallel to the connection section 7.3 in opposite directions to one another, i.e., extending with at least a radial component. The hook section 7.4 extends at the inner wall area 7.1 towards the outside and the hook section 7.5 extends from the outer wall area 7.2 towards the inside. The wall areas 7.1, 7.2 of a coil turn overlap in the axial direction with the respective other wall area of the adjacent coil turn, as this is obvious from FIG. 2a. The hook sections 7.4, 7.5 are radially enmeshed, more precisely each between the other hook section and the connection section 7.3.

This described embodiment forms a common wound hose formed from a metallic profile strip.

In the spiral wound metallic hose shown in the drawings, the strip material has an S-shaped profile in cross section, and axial sections 7.6, 7.7, each running parallel to the corresponding axial wall areas 7.1, 7.2, are connected to the hook sections 7.4, 7.5, whereby these sections of adjacent coil turns extend behind each other.

Such a coil or spiral wound metallic hose 7 in the embodiment described thus far is conventionally used in flexible conduction elements. It does not have sufficient heat insulation.

Figure 2B:
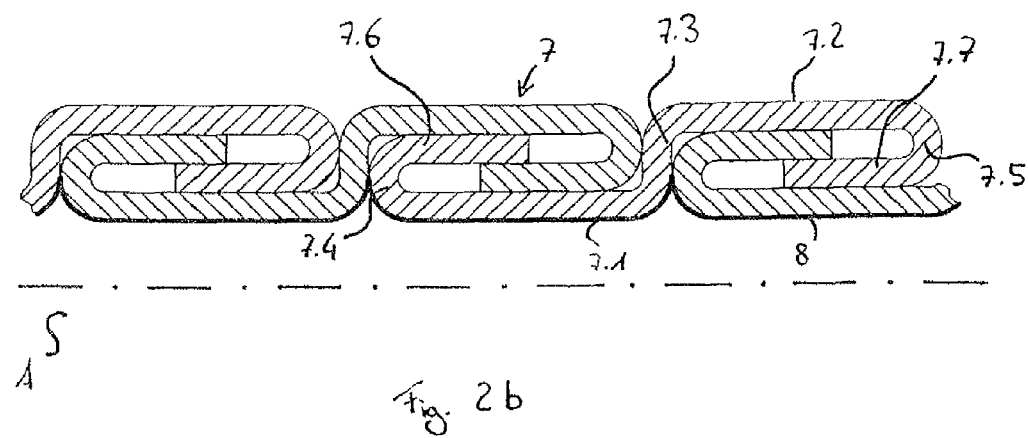
FIG. 2b is a sectional view showing the wound hose of FIG. 2a after applying the ceramic-based coating on one side as another essential process step according to the present invention for manufacturing a wound hose according to the present invention, preferably for use in a flexible conduction element according to FIG. 1.

A metal wound hose 7 designed and manufactured in the above manner is brought into the upset or compressed configuration shown in FIGS. 2a and 2b, in which the end sections 7.4, 7.5 of adjacent coil turns each lie on the connection section 7.3 of a coil turn, as this is shown in FIGS. 2a, 2b.

Preferably in this configuration, the wound hose 7 is first cleaned, such as by means of glass bead blasting, at least on the wall side to be coated, the inner wall areas shown in the exemplary embodiment, in order to make the surface to be coated oil- and grease-free.

A ceramic coating of the inner surface and thus of the inwards directed surfaces of the wall areas 7.1 of the wound hose is subsequently carried out as a wet coating likewise in the upset state, thus applying the ceramic-based layer in liquid form as well as subsequently curing the coating 8, and preferably at a high temperature, such as at, for example, 260° C. over one hour. A product of the Cerakote series from NIC Ind. Inc., 7050 Sixth Street, White City, Oreg. 97503/ USA, especially Cerakote C7300, is used as a coating material here.

Figure 2C:
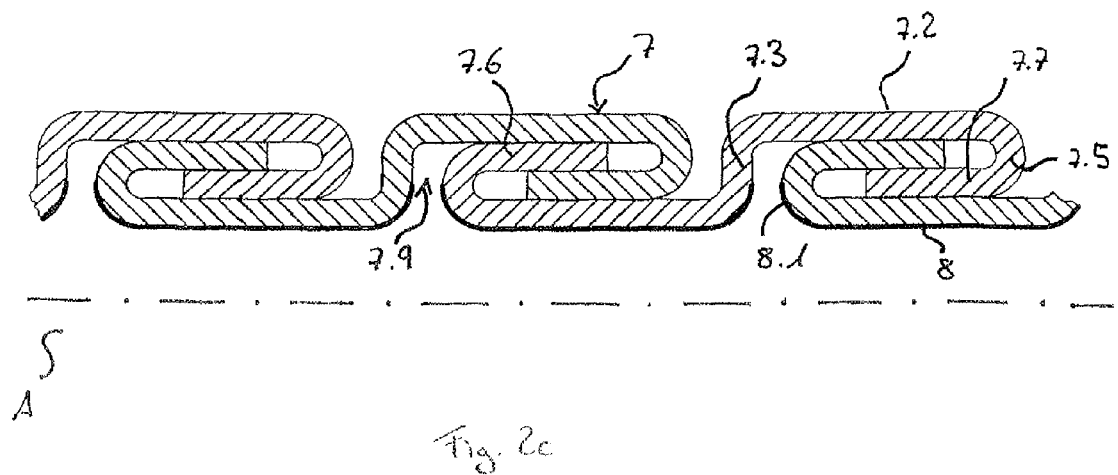
FIG. 2c is a sectional view showing the wound hose in a pulled-out configuration for separating the ceramic coating sections via the individual coil turns as another essential process step according to the present invention for manufacturing a wound hose according to the present invention, preferably for use in a flexible conduction element according to FIG. 1.

In a further process step, the wound hose 7 is pulled apart, as this is shown in FIG. 2c, whereby the coating 8 is broken up and thus separated at the contact points of the inner wall areas 7.1 in the upset state. As a result of this, the wound hose 7 obtains its mobility again. The wound hose 7 is subsequently inserted into the flexible conduction element (FIG. 1) and clamped at its ends by means of expanding; welding spots may also be placed for additional fastening.

The finished wound hose 7 according to the present invention, as is used in the flexible conduction element 1 of FIG. 1, has the embodiment shown in FIG. 2c, in which the inner wall areas 7.1 of the wound hose are provided with the coating 8. No coating is found in the gaps between the wall areas 7.1 of the wound hose with the hose pulled apart. The length of these areas is, however, low to negligible compared to the length of the wall areas 7.1 provided with the coating 8 when used in the pulled-apart state. A safe and reliable as well as permanent heat insulation in a wound hose and thus in the flexible conduction element shown in FIG. 1 is created by means of the coating according to the present invention. As a result of this, an effective heat protection of the bellows 2 of such a flexible conduction element is achieved.

In the said coating at an inner temperature of the wound hose 7 of 260° C., an outer temperature that is lower by approximately 61° C., i.e., approximately only 200° C., is achieved, for example. In the likewise usable ceramic coating Cerakote V171, a temperature reduction of 57° C. is achieved at an inner temperature of 600° C. and a temperature reduction of 102° C. is achieved at an inner temperature of 930° C.

While specific embodiments of the invention have been shown and described in detail to illustrate the application of the principles of the invention, it will be understood that the invention may be embodied otherwise without departing from such principles.

The invention claimed is:

1. A process for manufacturing a wound hose, the process comprising the steps of:
   manufacturing a metal wound hose from at least one metal profile strip, the wound hose comprising enmeshed metal turns with inner and outer wall areas lying on different radii with a radial extension component between;
   upsetting the metal wound hose such that adjacent wall areas of adjacent turns of the wound hose form at least one uninterrupted jacket wall surface;
   applying, subsequent to said step of upsetting, a ceramic-based coating to the at least one uninterrupted jacket wall surface;
   curing the coating to form a coated wound hose; and
   pulling apart, subsequent to said step of curing, the coated wound hose thus formed, whereby adjacent wall areas of adjacent turns are detached from one another and thereby the coating is broken up at partitions.

2. A process in accordance with claim 1, wherein the wall areas to be coated are cleaned by means of glass bead blasting, before applying the coating.

3. A process in accordance with claim 1, wherein the ceramic-based coating is cured at high temperatures, and in the range of 250° C. to 270° C., over a time between 40 and 60 minutes.

4. A process in accordance with claim 1, wherein the coating takes place by means of a liquid resin, which forms a three-dimensional ceramic matrix during the curing.

5. A process in accordance with claim 1, wherein both inner and outer wall areas of the wound hose are coated.

6. A metal wound hose manufactured from at least one metal profile strip, the wound hose comprising:
   enmeshed metal turns with inner and outer wall areas lying on different radii with a radial extension component between, wherein the metal wound hose is upset such that adjacent wall areas of adjacent turns of the wound hose form at least one uninterrupted jacket wall surface; and
   a ceramic-based coating applied to said uninterrupted jacket wall surface subsequent to upsetting said metal wound hose, said ceramic-based coating being cured, wherein the metal wound hose with said ceramic-based coating is pulled apart subsequent to curing said ceramic-based coating, whereby adjacent wall areas of adjacent turns are detached from one another and thereby the coating is broken up at partitions.

7. A wound hose in accordance with claim 6, wherein either only inner or outer wall areas are coated with said ceramic-based coating.

8. A wound hose in accordance with claim 6, wherein the areas both of the inner and outer wall areas, which are continuously directed away from each other radially, are provided with said ceramic-based coating.

9. A flexible conduction element with a metal bellows and a metal wound hose according to claim 6 as an inliner.

10. A conduction element in accordance with claim 9, wherein either only inner or outer wall areas are coated with a ceramic-based coating.

11. A conduction element in accordance with claim 9, wherein the areas of both the inner and the outer wall areas, which are continuously directed away from each other, are provided with said ceramic-based coating.

12. A wound hose in accordance with claim 6, wherein the wall areas to be coated are cleaned by means of glass bead blasting, before applying the coating.

13. A wound hose in accordance with claim 6, wherein the ceramic-based coating is cured at high temperatures in the range of 250° C. to 270° C., over a time between 40 and 60 minutes.

14. A wound hose in accordance with claim 6, wherein the coating takes place by means of a liquid resin, which forms a three-dimensional ceramic matrix during the curing.

15. A wound hose in accordance with claim 6, wherein both the inner and outer wall areas of the wound hose are coated with the ceramic-based coating.

* * * * *